United States Patent [19]

Trujillo

[11] 4,357,169
[45] * Nov. 2, 1982

[54] UNIFORM ASPHALT PAVEMENT AND PRODUCTION METHOD THEREFORE

[75] Inventor: Jose A. Trujillo, Albuquerque, N. Mex.

[73] Assignee: Riguez Associates, Albuquerque, N. Mex.

[*] Notice: The portion of the term of this patent subsequent to Sep. 9, 1997, has been disclaimed.

[21] Appl. No.: 123,207

[22] Filed: Feb. 21, 1980

Related U.S. Application Data

[63] Continuation-in-part of Ser. No. 23,390, Mar. 23, 1979, Pat. No. 4,221,603, which is a continuation-in-part of Ser. No. 764,336, Jan. 29, 1977, abandoned.

[51] Int. Cl.$^3$ ............................................. C08L 95/00
[52] U.S. Cl. ................................................. 106/281 R
[58] Field of Search ................. 106/281 R; 404/80, 81

[56] References Cited

U.S. PATENT DOCUMENTS

| | | | |
|---|---|---|---|
| Re.30,047 | 7/1979 | Lees et al. | 106/281 R |
| 2,884,841 | 5/1959 | Dickinson | 94/23 |
| 3,824,109 | 7/1974 | Richards | 106/281 R |
| 3,907,582 | 9/1975 | Walter | 404/81 |
| 3,965,281 | 6/1976 | Takase et al. | 404/80 |
| 4,196,922 | 4/1980 | Fabb et al. | 106/281 R |

OTHER PUBLICATIONS

Goode et al., Proceeding of the Association of Asphalt Paving Technologist, 31, Jan. 1962, pp. 197-199.

Primary Examiner—John Kight, III
Assistant Examiner—Amelia B. Yarbrough
Attorney, Agent, or Firm—Lawrence Harbin

[57] ABSTRACT

A uniform asphalt pavement of substantial area composed of aggregates of varying natural qualities produced by a systematic process including mix design, mix analysis, and plant control methods. A volumetric comparison is mathematically made between blendings of coarse and fine aggregates defined over a single sieve size and a Riguez Index to determine voidage in the compacted aggregate mixture. The Riguez Index is characteristic to the particular fine aggregates used in the blending. For controlling voidage at the mixing plant, the respective quantities of coarse and fine aggregates injected into the mixing plant is controlled over the same single sieve size used for demarcating coarse and fine aggregates in mathematically computing the volumetric comparison. Further, a stability function derived from different combinations of crushed fine and blend sand, and a flexibility function derived from different mix quantities of asphalt cement provide control of flexibility and stability values.

18 Claims, 7 Drawing Figures

UNIFORM ASPHALT PAVEMENT AND PRODUCTION METHOD THEREFORE

CROSS-REFERENCES TO RELATED APPLICATIONS AND PATENTS

This invention is a continuation-in-part of allowed U.S. application Ser. No. 023,390 filed Mar. 23, 1979 entitled MIX DESIGN METHOD FOR ASPHALT PAVING MIXTURES by the same inventor hereof, now U.S. Pat. No. 4,221,603, which is a continuation-in-part of Ser. No. 764,336, filed Jan. 29, 1977, now abandoned.

This invention is related to U.S. application Ser. No. 123,206 entitled ASPHALT PAVEMENT MIXING PLANT WITH PLURAL WEIGHT CELLS filed Feb. 21, 1980 by the same inventor hereof.

This invention is related to U.S. application Ser. No. 123,205 entitled UNSEGREGATOR SHROUD FOR HOT-MIX ASPHALT LAY-DOWN MACHINE filed Feb. 21, 1980 by the same inventor hereof.

BACKGROUND OF THE INVENTION

This invention concerns asphalt pavements. It also concerns systematic procedure for mix design, mix analysis, and job control for producing a uniform asphalt pavement of substantial length having uniform physical properties.

In the plant-mix type pavement construction, a road bed and/or subgrade on which an asphaltic concrete mixture is laid generally are prepared by grading, compacting, and leveling. The asphaltic mixture is prepared at a remote plant site and is transported to the prepared road bed. The mixture is then dumped in place, spread by a paving machine, and finally compacted in place by heavy steam rollers.

Plant-mix production consumes large quantities of materials, typically as much as 6000 tons per day, thus possibly depleting any given single aggregate source, such as a rock quarry, sand pit, or other source of mineral deposits. Aggregate materials of pavements of several miles or more generally are gathered from several sources and accordingly nonuniform pavements result from source variations. Furthermore during the initiation of a production run, several miles of pavement typically are laid before the materials engineer has acquired sufficient knowledge of the aggregate qualities to establish consistent physical properties in the pavement. In many cases, consistent qualities may never be achieved either because the production job is completed before the material engineer has had the opportunity to correct for source variations, or the nature and quality of the aggregate changes too rapidly for the materials testing engineer to perform required tests and determine appropriate corrective action at the mixing plant. In many cases, the aggregate source intentionally is changed to shorten the distance between the aggregate source and the mixing plant whereupon attempts are then made to bring the new mixture within job specifications.

At the mixing plant, the amount of asphalt cement injected into the mixing bin can be reasonably accurately controlled as a percentage by weight of the total mix. Effective asphalt cement governs the amount of air voids in the compacted mixture and varies as a function of their shape, absorption characteristics, and sizes. Attempts are made to regulate size by controlling gradation over a multitude of screen sizes, generally 8 to 10, ranging from coarse aggregates passing the 1" screen down to mineral filler passing the No. 200 screen. Gradation however is almost impossible to control the job mix formula at the mixing plant and at the lay-down site due to degradation and segregation of aggregates. Plant control in accordance with changes in absorption characteristics, aggregate shapes, or other natural qualities are at best based upon trial-and-error techniques.

No method previously exists for quickly measuring changes in the natural aggregate qualities at the mixing plant site to effect corrective action at the mixing plant during operation. Further, no method previously exists for quickly and accurately determining the necessary corrective action for effecting such proper control of the production plant at the plant site. Thus uniform asphalt pavements cannot be produced.

Frictional qualities also are difficult to achieve for dense graded mixes. An open graded overlay is now used for friction overlays. Frictional qualities are provided by the sharpe edges of $\frac{1}{2}$" to 1" coarse aggregate particles protruding upwardly of the riding surface. The asphalt cement in the present open graded frictional overlay is permeable to water and air penetration causing the cement to age prematurely resulting in deterioration of the pavement structure. The underlying surface of the friction overlay also deteriorates for the same reasons. One problem associated with attempts to lay dense graded friction courses is that the coarse rock is pushed down into the underlying asphalt pavement upon load application on the riding surface and thus frictional qualities disappear. Thus to reduce the effects of displacement and reorientation of aggregate particles, the present friction overlay is laid very open graded.

The design of optimum asphaltic mixture today is at best a trial-and-error procedure. Good mixes generally result from knowledge of aggregates, experience, and luck. Many limitations in achieving optimum pavement properties exist, even with the expert design engineer using known aggregates. With some aggregates, present techniques cannot be used to determine a mix design that meets job specifications, such as stability, flexibility, density, or voidage.

In an effort to produce uniform pavements, firstly mix design is performed by trial-and-error methods to determine what aggregate blendings asphalt cement combination will produce certain predesignated pavement qualities such as flexibility, stability, and air voidage; and secondly, crushing, mixing, and laydown operations are controlled to produce an asphalt pavement having the desired physical properties. The object is to produce a pavement so that the load is transmitted to the subgrade only through the rock while the mortar of fine aggegate and cement fill the intersticies between the rock. The aggregates are proportioned according to a predesignated job mix formula which comprises prescribed proportions of different sized aggregates generally ranging from a maximum size of one and one-half inch in diameter to a minimum aggregate size that passes the No. 200 sieve.

Two methods now in general use for mix design and quality testing are the Marshall and the Heevm methods. According to these methods, test specimens are prepared by compacting trial mixes within the limitations of predesignated job mix formula tolerances, and then tested in an effort to determine which blend possesses desired physical properties, such as flexibility, flowability, density, stability, etc. This procedure consumes as much time as two to three weeks. It must be repeated when the natural qualities of the aggregates change during the production operation or when different degrees of segregation and degradation of aggregates occur during stockpiling, transporting and handling.

An asphalt pavement containing a large amount of air voids is an "open graded mix". It is vulnerable to deterioration due to water seepage throughout the pavement. Water weakens the binding effect of the asphalt cement by stripping the cement from the surface of the aggregates. An open graded mix also is subject to aeration which shortens the pavement life due to oxidation of the asphalt cement. Aeration decreases the viscosity of the cement, causing it to become brittle and ultimate breakup of the pavement. Where prolonged road life is not important, an open graded mix, within certain limits, however is used to produce a high friction riding surface. Road pliability having resilient characteristics is sacrificed in open graded mixes.

The nature of the coarse aggregates determine, among other things, the load bearing and riding characteristics of the pavement. Specific qualities of concern include hardness, shape, porosity, and other surface qualities. Coarse aggregate may consists of crushed rock, volcanic rock, hydraulically tumbled stoned, or other large mineral deposits.

A pavement having a small amount of air voids is known as a "dense graded mix". This mixture has a larger quantity of the fine aggregate/cement mortar. Present dense graded mixtures have poor stability and deform under load forces as the coarse aggregates do not properly transmit loads to the subgrade. Where load conditions permit, pavements comprising dense graded mixes are used when high pliability is desired.

A maximum "bulking point" is defined herein as the proportion (percentage by weight of dry coarse aggregate with respect to total weight of dry aggregate in mixture) at which each coarse aggregate particle touches one another while the mortar of fine aggregate and asphalt cement fill all interstitices between the coarse aggregate. The gradation at which the bulking point occurs essentially depends on the shape of the coarse aggregate. For example, the available volume of space between contiguous hydraulically tumbled stone is different than the available volume between contiguous crushed rock, and thus a mixture including one type of coarse aggregate may have a different bulking point than a mixture of another type of coarse aggregate. A mix at or above the bulking point mixture generally is unacceptable because it lacks, among other things, sufficient flexibility, and resistance to air and water penetration. Some presently specified job mix formulas completely ignore bulking point limitations in the specification.

A "balance point" is defined herein as the gradation at which each coarse aggregate particle are in close proximity to one another while the mortar of fine aggregate, asphalt cement, and desired dispersed air voids fill all interstitices between the coarse aggregate. There should be just enough asphalt cement in the mixture to cover the surfaces of all aggregates in the mixture, and just enough air voids to allow for proper expansion and contraction of the pavement under the climatic conditions without penetration of excessive water and air. Thus the air voids are the separating factor between dense and open graded mixes below the bulking point. Excessive asphalt cement reduces stability and too little asphalt cement generally reduces flexibility. The voidage control is difficult to achieve and maintain during the mixing operation because of myriad variables, some of which have been previously indicated, and accordingly, uniform pavements cannot be produced by present techniques.

At least one procedure presently in use for designing a mixture which has the desired quantity of air voids is the manipulation of the job mix formula of discrete sized aggregates over the entire gradation scale. Specifically, Fuller Maximum Density Curves and the Federal Highway Administration 0.45 Power Gradation Chart currently are in use. Their use is described in "Mix Design Methods for Asphaltic Concrete and other Hot-Mix Type" published by The Asphalt Institute, manual series No. 2, fourth edition, March, 1974. The basis for the FHA 0.45 power gradation chart is described in detail in volume 31, pages 176 through 207 of the "Proceedings of the Association of Asphalt Paving Technologist", Jan. 29, 1962. The theory of controlling voidage is based on the principle that a gradation deviating from a maximum density curve will contain increased air voids. Thus some obscure relationship between job mix formula and voidage is developed for job control. It is rarely successful particularly in view of segregation and degradation of aggregates while being handled and transported to and from the crushing plant, stock piles, mixing plant, and laydown site. Degradation between the crushing plant and the mixing plant alone may amount to as much as 30%.

Another method for computing voids in the mineral aggregate is disclosed in volume 34, pages 574 through 594 of the "Proceedings of the Association of Asphalt Paving Technologist". The computations are based upon successive correlations of voids in discrete ranges of the gradation spectrum. Page 577 of the treatise illustrates 8 gradation ranges between mineral filler and ⅜ to ¾ inch aggregate. By summing the voidage contained in each aggregate group, and considering the correlation factors of aggregate voidage, a sum total is obtained which closely approximates the final aggregate voidage. No clue however is given to how one might achieve this ideal combination of aggregate mixture at the mixing plant nor is any consideration given to variation in effective asphalt cement.

In any job, the use of local indigenous materials is desired, if at all possible, because of expensive transportation cost in transporting aggregates across the country. Certain jobs however do not lend themselves to the use of such indigenous materials because of widely varying changes in natural aggregate qualities that render mixing plant control almost impossible. In that case, materials are imported from a distant source.

SUMMARY OF THE INVENTION

In view of the foregoing, it is one objective to provide a uniform asphalt pavement of substantial area which pavement is produced from aggregates of varying natural quality.

It is another objective of this invention to provide an in situ plant control method for controlling gradation of the mixture thereby to produce a uniform ashpalt pavement.

It is another objective of the invention to provide a systematic mix design and plant control method for producing a uniform pavement having predetermined physical properties such as flexibility, flowability, stability, workability, voids in mineral aggregates, voids filled, density, and air voids.

In accordance with this invention, a uniform asphalt pavement of substantial area having a substantially constant volume of effective air voids under a standard compaction is produced by a systematic procedure of mix design, mix analysis, and plant control to compensate for variations in specific gravity, particle shape, absorption, size distribution, or consolidation of the aggregates that comprise the pavement. To achieve mix design: firstly, the aggregates are demarcated thereby to define coarse and fine aggregates; secondly, an Index quantity is derived that represents the quantity of fine aggregate particles that is contained in a unit volume of the bulk fine aggregate compacted under the standard compaction, such as the compactive effort defined by the Marshall method; and thirdly, a proportion of coarse and fine aggregate are selected wherein the mathematiacally computed quantity of fine aggregate per unit of the combined volumes $V_{FA}$ and $V_{EAC}$ substantially equals the Index quantity according to the volumetric relationship:

$$V_{CA} + V_{FA} + V_{EAC} + V_{EA} = 1 \text{ unit volume}$$

where $V_{CA}$ is the volume of the coarse aggregate, $V_{FA}$ is the volume of the fine aggregate, $V_{EAC}$ is the volume of the effective asphalt cement, and $V_{EA}$ is the volume of the desired effective air voids under the standard compaction. Plant control is achieved during the mixing process by periodically selecting a proportion according to the mix design process and adjusting the proportioning controls of the plant to said selected proportion thereby to maintain the desired air void volume $V_{EA}$, and thus produce a substantial area of uniform asphalt pavement having a constant or controlled volume of air voids. Mix analysis is performed on production outputs of the mixing plant to assure proper proportioning. Standard compaction can be performed by the Marshall method, or by a similar compacting method that consolidates the fine aggregates to their upper limits of consolidation. Coarse and fine aggregates may be demarcated by the No. 4 or similar size aggregate sieve. A friction overlay also is produced by this method.

A further aspect of this invention comprises a systematic procedure for determining the flexibility stability indexes of an asphalt pavement mixture by varying the quantity of asphalt cement and crushed fine aggregates in the mixture.

The advantages of this invention include the ability to produce uniform pavements of substantial area, reduction of testing procedures and time, and reduction of cost of design and construction. More importantly, my asphalt pavements, can have a useful life exceeding 20–25 years, as opposed to six months to five years for present asphalt pavements.

Because an analysis of any mixture of aggregates can be made by this invention, aggregate material from existing pavements already in place can be crushed and recycled to produce new pavements thereby obviating the need to excavate and transport aggregate material from a distant source.

Further, pavements of both high flexibility (12 to 16) and high stability (2000 psi to 3000 psi) not otherwise achievable can now be produced with exceptional frictional qualities. Such asphalt pavements can provide long-lasting safer operation of asphalt concrete airports runways and highways than conventional portland cement runways and highways with friction gratings.

These and other aspects and advantages of the invention will become readily apparent upon review of the succeeding disclosure taken in connection with the accompanying drawings. The invention however is pointed out with particularity in the appended claims.

DETAILED DESCRIPTION OF THE DRAWINGS

DESCRIPTION OF ILLUSTRATIVE EMBODIMENT

Figure 1:
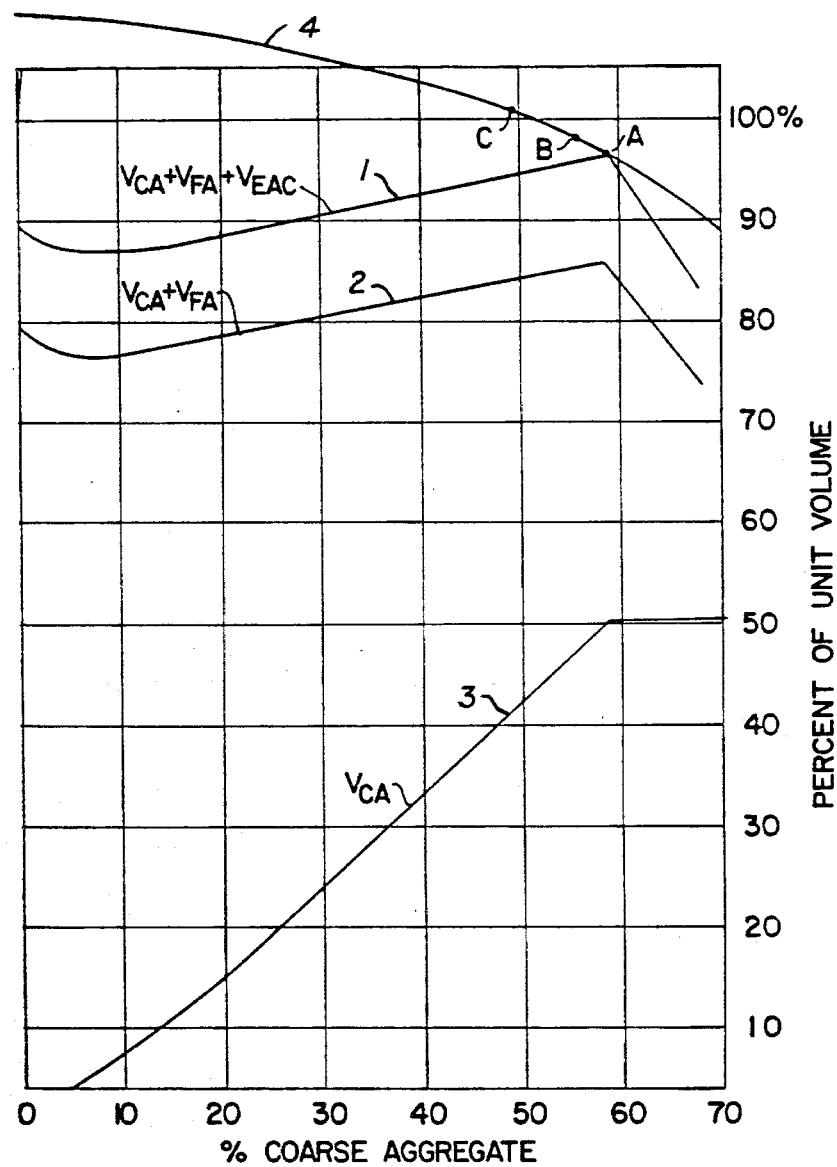
FIG. 1 depicts volumetric relations of the aggregate blend as a function of gradation.

In developing my invention, I made the following observations and discoveries:

The nature and quality of the fine material aggregates passing the No. 4 sieve essentially determine all behavioral qualities, e.g. durability, flexibility, compactibility workability, and stability of the blended mixture because a change in its natural qualities affects air voids and effective asphalt cement to a significantly greater extent than the coarse aggregates.

Voidage can be mathematically computed with knowledge of the maximum consolidation of the fine aggregates and asphalt cement which is based upon the specific gravities, particle shape, and absorption characteristics of all aggregates in the mixture.

The composition of fine aggregates supplied to a mixing plant can easily be controlled within close tolerance as its segregation and degradation is neglible. Plant control can be effected by controlling the quantity of fines relative to the quantity of rock.

The nature and quality of the rock within the entire mixture determine only the load bearing strength and rigidity of the pavement. The composition, e.g. blend of different sized rock, does not have any significant effect of other qualities of the mixture.

The degradation and segregation of the rock supplied to a mixing plant can be monitored and controlled within a high degree of accuracy thereby providing effective gradation control at the mixing plant for producing my uniform pavement.

The amount of air voids remaining in a compacted mixture can be controlled by adjusting the proportion of the aggregates over a single screen size comparable to the No. 4 screen, by varying the quantity of asphalt cement.

The flexibility and stability of an asphalt pavement mixture can be controlled by varying the ratio of crushed fine aggregates to blend sand (river sand).

Stability can be increased by including crushed fine aggregates which have been subjected to extended crushing.

The best demarcation between coarse and fine aggregates for defining gradation and controlling the mix proportions at the mixing plant is a sieve size approximating the No. 4 screen (0.187 inches or 4.75 mm.).

The mix proportions can be maintained at the mixing plant by separately controlling and feeding controlled quantities of coarse aggregates and fine aggregates fed to the mixing plant. Blended aggregate samples are withdrawn approximately every two hours, or as needed, and examined for aggregate gradation over a single sieve size, such as the No. 4 screen. Control of the blended mixture of aggregates over this single sieve size is obtained by regulating the feeding controls of the separate aggregate storage bins to control the mixture over all sieve sizes of the job mix formula. A mixing plant having separate feeding controls and separate monitoring means for the coarse and fine aggregates is disclosed in my copending U.S. application Ser. No. 123,206 entitled Asphalt Pavement Mixing Plant Having Plural Weight Cells which was filed of even date herewith. For support of appended claims, all essential matter disclosed therein is incorporated herein by reference.

Based upon the foregoing observations and discoveries, I have discovered an Index quantity herein called the Riguez Index to which graded blends of aggregates are compared on a volumetric basis thereby to design mixes, analyze mixes, and control the mixing plant. The composition of my uniform pavement comprises aggregate mixtures within the following mix proportions and possessing the natural aggregate qualities as determined by the indicated AASHTO test procedures; but are not limited to these ranges:

| Fine Aggregate | | |
|---|---|---|
| Bulk Specific Gravity | 2.676 | (166.98#/CF) |
| Absorption | 1.07% | |
| Effective Specific Gravity | 2.705 | (168.79#/CF) |
| Coarse Aggregate | | |
| Bulk Specific Gravity | 2.708 | (168.98#/CF) |
| Absorption | 1.84% | |
| Effective Specific Gravity | 2.758 | (172.10#/CF) |
| Asphalt Cement | | |
| Specific Gravity (AR2000 Asphalt) | 1.0146 | (63.31#/CF |
| Job Specifications: | | |
| Asphalt cement | 5% | by weight |
| air void volume | 5% | in compacted mixture |
| Fine Aggregate Blend (% Passing) | | |
| no. 4 | 100% | |
| no. 8 | 70%–85% | |
| no. 16 | 46%–62% | |
| no. 40 | 25%–40% | (not more than 7% passing no. 200) |
| Combined Fine and Coarse Aggregate (% Passing) | | |
| ¾ inch | 100% | |
| ½ inch | 95% | |
| ⅜ inch | 50%–60% | |
| no. 4 | 44%–54% | |
| no. 8 | 31%–45% | |
| no. 16 | 20%–34% | |
| no. 40 | 12%–22% | |
| no. 200 | 2%–6% | |

Natural variation in absorption and particle shape normally contributes 2% to 5% error in designed air voidage. Natural variations in densities of aggregates normally fluctuate 5% to 15% for aggregates excavated from a single location. Since the quantity of asphalt cement injected in the mixture is based upon total weight of aggregates, and that naturally occurring density variations fluctuate 5% to 15% for aggregates excavated at a single source; the quantity of effective asphalt cement in the mix varies to such a degree causing fluctuations in air voidage of ±10% or more, flexibility to fluctuate ±5 points or more, and stability to fluctuate by more than 1000 psi or more. These errors are typical for aggregates generally used in asphalt pavement production. Occasionally, they are much worse due to radical changes in the formation of the rock at the site of excavation of the aggregates.

The worst errors though are brought about by the large tolerances allowed in the job mix formula and job specifications that are predesignated by the contracting authority. A typical gradation tolerance allowed between coarse and fine aggregate is 30% to 50% retained on No. 4 screen. It will be seen by the teachings of this invention that variations within that range could produce open graded mixtures having more than 15% to 20% air voids, or a stability of more than 1000 psi under a predesignated Marshall strength, or a flexibility more than 10 points below desired amount.

By using the techniques of my invention however, I am able to maintain air voidage, void filled, or voids in mineral aggregate (V.M.A.) constancy within less than ½% tolerance.

DERIVING THE RIGUEZ INDEX

The Riguez Index indicates the extent of compactibility of the mixture. It measures only the fines as the coarse rock does not compact. The Index, when periodically determined during production, measures natural variations in absorption, specific gravities, and particle shape of the fines thereby to allow the proper relationship between effective asphalt cement and aggregate to be maintained, and the air voidage to be maintained. When making the volumetric comparison, only the absorption and density of the aggregate are needed.

The Riquez Index is empirically derived by mixing and compacting a mortar comprising a mixture of a representative sample only of the fine aggregate blending to be used in a job and the specified quantity of asphalt cement. Mixing and compacting are performed by the Marshall or similar method which is described in the previously mentioned "Mix Design Methods for Asphalt Concrete and Other Hot Mixes" published by the Asphalt Institute. Prior to compacting, the Marshall method provides for heating and mixing the aggregates at 230 degrees Farenheit, plus or minus 10 degrees Farenheit, to ensure adequate homogenity of the mixture. The compactive effort applied is equivalent to 75 blows with a ten-pound hammer with an eighteen-inch drop on both sides of the hot mix, or an equivalent of 43,000 foot-pounds of pressure. Approximately 1100 grams of the loose mixture is used to produce the specimen of about 2½ inches in height. After allowing the speciment to cool, the bulk density of this specimen is determined by weighing it in air to determine weight, and measuring its displacement in water to determine its volume. Several specimens are made to assure accuracy. This procedure can be completed within two hours.

The Riguez Index is computed by subtracting the known weight of asphalt cement from the bulk density of the speciment thereby to derive the weight of dry fine mineral agregate contained in a unit volume. Riquez Values O.D. (oven dried), defined herein as the WEIGHT OF THE DRY FINE MINERAL AGGREGATE PER CUBIC FOOT CONTAINED WITH ITS OWN VOLUME PLUS THE VOLUME OF EFFECTIVE ASPHALT CEMENT. A Riguez Index S.S.D. (saturated surface dried) and Riguez Values S.S.D. are used for mix design, mix analysis and job control in my invention. They are determined by adding to the weight of dry aggregate per cubic foot, the weight of asphalt cement absorbed by the dry fine aggregate. The Riguez Index S.S.D. is herein called the Riguez Index.

Different blendings of fine aggregates or fine aggregates from different sources have different characteristic Riguez Indexes. Thus any physical property of the Riquez specimen can be used as job control parameter to be monitored during production for producing uniform pavements of substantial length from aggregates of differing natural qualities.

An average Riguez Index for the exemplary aggregates used herein was determined as follows:

Bulk Density of Riquez Index specimens with 5% A.C. 2.247

Riguez Index computations: $2.247 \times 62.4 = 140.21$ lbs/CF $\times 95\% = 133.20$ lbs/C.F. O.D.

Absorption:
  $133.2$ lbs $\times 1.07\% = 1.42$ lbs/$166.98$ lbs $= 0.85\%$ in Volume
  $0.85\% \times 63.31$ lbs $= 0.54$ lbs A.C.
  Riquez Index SSD $= 133.2$ lbs $+ 0.54$ lbs $= 133.74$ lbs/C.F.

GENERATING VOLUMETRIC FUNCTIONAL RELATIONSHIPS

FIG. 1 depicts the volumetric behavior of aggregate blendings as a function of proportion for my exemplary aggregates with the indicated job specifications. The curves are arithmetically computed using respective density values of rock and fines, respective absorption values of the rock and fines, and the specific gravity of the asphalt cement. Specifically curve x represents the combined volume of the rock VCA, fines VFA, and effective asphalt cement VEAC as a function of gradation. The difference between curve x and 100% value represents the effective air voids VEA that will be contained in a blended mixture as a function of gradation when the blended mixture is compacted with the same compacted effort of the Riguez Index specimen. Curve x is derived under the assumption that only the mortar of fines are compacted and that rock is incompressible. Curve v represents the combined volume of the rock VCA and fines VFA as a function of gradation. Curve z represents the volume only of the rock VCA as a function of gradation. Representations of aggregate behavior also can be made with quantity of asphalt cement, rather than gradation, as the varible without departing from the spirit and scope of my invention.

The Riguez Value Curve depicted in FIG. 1 shows the relationship between densities of the mortar of the fine aggregate portion of the graded mixture as a function of gradation and the density of the mortar of the fines of the Riguez Index specimen. For example, at the balance point (51.71% rock) indicated thereon, a unit volume of the mortar plus asphalt cement plus five percent air contains the same quantity of fines as a unit volume of the Riguez Index specimen. The gradation at which the balance point is reached is a function of the natural qualities of the aggregates. Thus only the fine aggregates of the mixture need be monitored at the mixing plant. As soon as the natural qualities change, so does the balance point. Thus the mixing plant can be adjusted if a change in the Riguez specimen is noted during the operation of the mixing plant. If the change is small, only the proportion is altered to compensate for change in voidage. The quantity of asphalt cement also can be altered to correct for voidage changes resulting from changes in the volume of the Riguez Index specimen. If the change is great, a new set of curves are computed to determine the new balance point of the mixture for more accurate compensation of air voidage at the mixing plant. Since the Riguez Index in indicative of maximum consolidation of the fine particles, the Riguez Values show the extent consolidation of particles of the blended mixture including five percent air voids. The Riguez Value curve indicates the percent error as the proportion moves away from the balance point. It is seen that the Riguez Value curve is nearly constant with respect to gradation at the balance point. Thus a range within a few percentage points of the balance point is used for job control at the mixing plant.

It is interesting to note that at some gradation greater the balance point, the Riguez Value curve intersects curve x. Experimentally conducted tests shows the gradation at which the Riguez Value curve intersects curve x in the "bulking point" of the mixture. Thus, in accordance with another aspect of my invention, the bulking point of a blended mixture can be arithmeticaly calculated. That information is useful for establishing gradation limits or job mix formula limitations for mix design purposes. For the aggregate used herein, the theoretical bulking point was empirically proven by laboratory test to be 85 pounds of rock per cubic foot or 58.8%.

To illustrate the exact procedure for computing the x, y, z, Riguez Value curves as a function of proportion, I performed step-by-step calculations at three proportion points on the gradation scale, beginning at and descending from the bulking point. As previously indicated, mixtures above the bulking point do not produce good pavements as the air voids becomes uncontrollable. Accordingly, my analysis is not use for aggregate mixtures above the bulking point. These computation can be performed by a digital computer. The graphical presentation resulting these curves is useful for controlling the mixing plant.

| POINT A - CALCULATIONS OF VOLUMETRIC VALUES OF MIX WITH 85# OF ROCK | |
|---|---|
| 1. 85#/168.98#   CF Dry Rock | 50.30% |
| 2. Program 5% desired effectiver air | 5.00% |
| 3. Volume occupied by Rock plus 5% Effective Air | 55.30% |
| 4. Volume available for Fines plus Asphalt Cement (100 − 55.30) | 44.70% |
| 5. Dry Weight of Fines to 1 CF: 133.2# × 44.70% | 59.54# |
| 6. Combined Dry Weight of Aggregates 85# plus 59.54# | 144.54# |
| 7. Percentage Rock Dry Weight of Aggregate 85#/144.54# | 58.80% |
| 8. Total Weight of mix without absorption factors 144.54#/95% | 152.15# |

-continued

| | | |
|---|---|---|
| 9. Absorption: | | |
| | 85# × 1.84% = 1.56#/168.98#CF | 0.92% |
| | 59.54# × 1.07% = 0.64#/166.98#CF | 0.38% |
| | Absorption on the basis of combination | 1.30% |
| 10. Asphalt Cement Absorbed 1.30% × 63.31#C | | 0.82# |
| 11. 0.82#/152.15# = 0.54% on the basis of Total Mix. | | |
| 12. 0.54% × 95% = 0.51% on the basis of total aggregates. | | |
| 13. Effective Asphalt Cement 5.00% − 0.51% | | 4.49% |
| Absorption values within a range of the gradation scale will be practically the same. The analysis from this point will be on the mixture with absorption factors: | | |
| 14. Volume of Rock 85# + 1.56# = 86.56#/172.10# | | 50.30% |
| 15. Program 5% Effective Air | | 5.00% |
| 16. Volume occupied by Rock plus 5% Effective Air | | 55.30% |
| 17. Volume available for Fines plus A.C. (100% − 55.30) | | 44.70% |
| 18. SSD Weight of Fines to 1CF = 133.74# × 44.70% | | 59.78# |
| 19. SSD Weight of Aggregates 86.56# + 59.78# | | 146.34# |
| 20. Total Weight of Mixture 146.34#/100 − 4.49% | | 153.22# |
| 21. Weight of Effective Asphalt Cement 153.22# − 146.34# | | 6.88# |
| 22. Final Volumetric Analysis: | | |
| | Total Weight | 153.22# |
| | Effective Asphalt Cement | 6.88# |
| | SSD Weight of Aggregates | 146.34# |
| SSD Wt. Rock 86.56#/172.10# = | 50.30% Volume of Rock | |
| SSD Wt. Fines 59.78#/168.79# = | 35.42% Volume of Fines | |
| | 85.72% Volume of Aggr. | |
| 100 − 85.72% = 14.28% Voids in Mineral Aggregate | | |
| 6.88#/63.31# = 10.87% Volume of Effective A.C. | | |
| | 3.41% Volume of Effective Voids | |
| 23. Percentage Voids Filled 10.87%/14.28% | | 76.12% |
| 24. Calculated Voidless Mix 153.22#/100 − 3.41% | | 158.63#CF |
| 25. Riguez Values 59.78#/35.42% plus 10.87% | | 129.14#CF |
| 26. Riguez Value of original Index 129.14#/133.74# | | 96.56% |

| POINT B - CALCULATIONS OF VOLUMETRIC VALUES OF MIX WITH 80# ROCK | |
|---|---|
| These calculations with identical values of Riguez Index, Effective Air and Asphalt Cement, as were used for Point A. | |
| 1. 80#/168.98# = CF Dry Rock | 47.34% |
| 2. Program 5% desired Effective Air | 5.00% |
| 3. Volume occupied by Rock plus Effective Air | 52.34% |
| 4. Volume available for Fines plus Asphalt Cement (100 − 52.34) = | 47.66% |
| 5. Dry Weight of Fines to 1 CF 133.2# × 47.66% | 63.48# |
| 6. Combined Dry Weight of Aggregates 80# + 63.48# | 143.48# |
| 7. Percentage Rock Dry Weight of Aggregate 80#/143.48# | 55.76% |
| 8. Total Weight of mix without Absorption 143.48#/95% | 151.03# |
| 9. Absorption: | |

| | | |
|---|---|---|
| | 80# × 1.84% = 1.47#/168.98#CF | 0.87% |
| | 63.48# × 1.07% = 0.68#/166.97#CF | 0.41% |
| | Absorption on the basis of combination | 1.28% |
| 10. Asphalt Cement Absorbed 1.28% × 63.31# | | 0.81# |
| 11. 0.81#/151.03# = 0.54% on the basis of Total Mix. | | |
| 12. 0.54% × 95% = 0.51% on the basis of total aggregates. | | |
| 13. Effective Asphalt Cement 5.00% − 0.51% | | 4.49% |
| 14. Volume of Rock 80# + 1.47# = 81.47#/172.10# | | 47.34% |
| 15. Program 5% Effective Air | | 5.00% |
| 16. Volume occupied by Rock plus 5% Effective Air | | 52.34% |
| 17. Volume available for Fines plus A.C. (100% − 53.34%) | | 47.66% |
| 18. SSD Weight of Fines 133.74# × 47.66% | | 63.74# |
| 19. SSD Weight of Aggregates 81.47# + 63.74# | | 145.21# |
| 20. Total Weight of Mix 145.21#/100% − 4.49% | | 152.04# |
| 21. Weight of Effective Asphalt Cement 152.04# − 145.21# | | 6.83# |
| 22. Final Volumetric Analysis: | | |
| | Total Weight | 152.04# |
| | Effective Asphalt Cement | 6.83# |
| | SSD Weight of Aggregates | 145.21# |
| SSD Wt. Rock 81.47#/172.10# | 47.34% Volume of Rock | |
| SSD Wt. Fines 63.74#/168.79# | 37.76% Volume of Fines | |
| | 85.10% Volume of Aggr. | |
| 100% − 85.10% = 14.90% Voids in Mineral Aggregates | | |
| 6.83#/63.31# = 10.79% Volume of Asphalt Cement | | |
| | 4.11% Volume of Effective Voids | |
| 23. Percentage Voids Filled 10.79%/14.90% | | 72.42% |
| 24. Calculated Voidless Mix 152.04#/100% − 4.11% | | 158.55# |
| 25. Riguez Values 63.74#/37.76% − 10.79% = | | 131.29# |
| 26. Riguez Value of original Index 131.29#/133.74 | | 98.27% |

| POINT C - CALCULATIONS OF VOLUMETRIC VALUES OF MIX WITH 70# ROCK |
|---|
| These calculations with identical values of Riguez Index, |

-continued

| Effective Air and Asphalt as were used for Points A and B. | |
|---|---|
| 1. 70#/168.98# = CF Dry Rock | 41.43% |
| 2. Program 5% Desired Effective Air | 5.00% |
| 3. Volume occupied by Rock plus 5% Effective Air | 46.43% |
| 4. Volume available for Fines plus Asphalt Cement (100 − 46.43) | 53.57% |
| 5. Dry Weight of Fines 133.2# × 53.57% | 71.36# |
| 6. Combined Dry Weight of Aggregates 70# + 71.36# | 141.36# |
| 7. Percentage Rock Dry Weight of Aggregate 70#/141.36# | 49.52% |
| 8. Total Weight of mix without Absorption 141.36#/95% | 148.80# |
| 9. Absorption: | |
| 70# × 1.84% = 1.29#/168.98#CF | 0.76% |
| 71.36# × 1.07#/166.98#CF | 0.46% |
| Absorption on the basis of combination | 1.22% |
| 10. Asphalt Cement Absorbed 1.22% × 63.31# | 0.77# |
| 11. 0.77#/148.80# = 0.52% on the basis of Total Mix. | |
| 12. 0.52% × 95% = 0.49% on the basis of total aggregates. | |
| 13. Effective Asphalt 5.00% − 0.49% | 4.51% |
| 14. Volume of Rock with Absorption 70# + 1.29# + 71.29#/172.10# = | 41.43% |
| 15. Program 5% Effective Air | 5.00% |
| 16. Volume occupied by Rock plus 5% Effective Air | 46.43% |
| 17. Volume available for Fines plus A.C. 100% − 46.43%) | 53.57% |
| 18. SSD Weight of Fines 133.74# × 53.57% | 71.64# |
| 19. SSD Weight of Aggregates 71.29# + 71.64# | 142.93# |
| 20. Total Weight of Mix 142.93#/100% − 4.51% | 149.68# |
| 21. Effective Weight of Asphalt Cement 149.68# − 142.93# | 6.75# |
| 22. Final Volumetric Analysis: | |
| Total Weight 149.68# | |
| Weight of Effective Asphalt Cement 6.75# | |
| SSD Weight of Aggregates 142.93# | |
| SSD Wt. Rock 71.29#/172.10# 41.42% Volume of Rock | |
| SSD Wt. Fines 71.64#/168.79# 42.44% Volume of Fines | |
| 83.86% Volume of Aggr. | |
| 100% − 83.86% = 16.14% Voids in Mineral Aggregates | |
| 6.75#/63.31# = 10.66% Volume of Effective A.C. | |
| 5.48% Volume of Effective Voids | |
| 23. Percentage Voids Filled 10.66%/16.14% | 66.05% |
| 24. Calculated Voidless Mix 149.68#/100% − 5.48% | 158.35# |
| 25. Riguez Values 71.64#/42.44% plus 10.66% | 134.91# |
| 26. Riguez Value of original Index 134.91#/133.74# | 100.87% |

Some information about the physical properties of the mixture is readily ascertainable as illustrated in the following Table 1. The balance point information was derived by interpolation means. Total Vol. quantity represents combined volume of aggregates and effective asphalt cement.

TABLE 1

| Calc. Number | Value | Point A | Point Balance Point B | Point C |
|---|---|---|---|---|
| 1 | # Rock | 85 | 80 | 73.48 | 70 |
| 7 | % Rock | 58.80 | 55.76 | 51.71 | 49.51 |
| 13 | % Eff. A.C. | 4.49 | 4.49 | 4.50 | 4.51 |
| 20 | T.W. #'s | 153.22 | 152.04 | 150.49 | 149.68 |
| 22 | Vol % Rock | 50.30 | 47.34 | 43.49 | 41.42 |
| 22 | Vol % Fines | 35.42 | 37.76 | 40.82 | 42.44 |
| 22* | Vol % Aggr. | 85.72 | 85.10 | 84.31 | 83.86 |
| 22 | % VMA(voids) | 14.28 | 14.90 | 15.69 | 16.14 |
| 22* | Vol Eff. A.C. | 10.87% | 10.79% | 10.69% | 10.66% |
| 22 | % Eff. Voids | 3.41 | 4.11 | 5.00 | 5.48 |
| * | Total Vol. | 96.59 | 95.89 | 95.00 | 94.52 |
| 23 | % Voids Fill | 76.12 | 72.42 | 68.13 | 66.05 |
| — | 70% Void Fill | 95.72 | 95.53 | 95.29 | 95.16 |
| — | 65% Void Fill | 95.00 | 94.74 | 94.51 | 94.36 |
| 26 | Riguez Value | 96.56 | 98.27 | 100.00 | 100.87 |

As used in this specification, the expression "#" means the unit of weight "pound", and the expression "CF" or "C.F." means the unit of volume "cubic foot".

Figure 2:
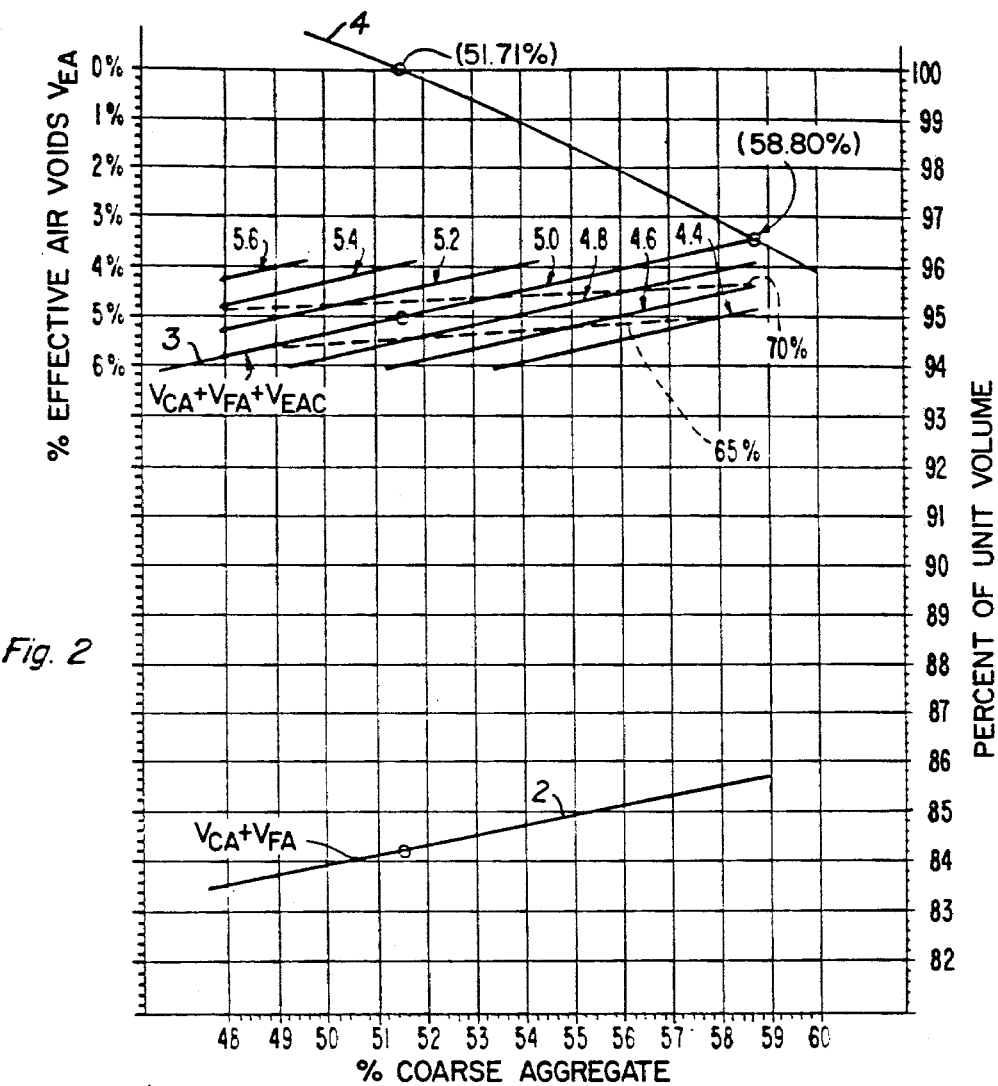
FIG. 2 depicts an enlargement of a section of the chart of FIG. 1 that is useful for job control at the mixing plant, mix design, or analysis purposes.

The Riguez Value curve of FIGS. 1 and 2 is derived from calculation 26 of points A (96.56%), B (98.27%), and C (100.87%), which represents different ratios between (a) the Riguez Value associated with the respective proportions of coarse and fines, and (b) the Riguez Index (133.74 pounds/cubic foot). The relationships for other proportions are graphically derived by interconnecting points A, B, and C, as depicted in FIGS. 1 and 2. Calculation 25 is the Riguez Value expressed as the S.S.D. weight of fine aggregate per combined volumes of fine aggregate $V_{FA}$ and effective asphalt cement $V_{EAC}$. For example, calculation 25 of point A expresses the Riguez Value as the S.S.D. weight of fine aggregate (59.78 pounds) which occupies the 35.42% (calculation 22) of the unit volume divided by the sum of its own volume (35.42%) and the volume of the effective asphalt cement (10.87%), which equals 129.14 pounds per cubic foot. Thus, the Riguez Value of a mixture of the proportion associated with point A equals the ratio of 129.14/133.74, or 96.56% of the original Riguez Index. Similar calculations are illustrated for points B and C.

At the "Balance Point", the Riguez Value equals the Riguez Index, as previously indicated. FIG. 2 shows that the Balance Point is attained at a proportion, or gradation of coarse and fine aggregates, of 51.71% coarse aggregate and 48.31% fine aggregate; which implies that the amount of fines contained in a volume constituted by the fine aggregate and effective asphalt of a Balance Point mixture equals 133.74 pounds per cubic foot. This is the same quantity of fines contained in a unit volume of the Riguez Index specimen. Accordingly, a mixture of such proportion possesses the Balance Point parameters depicted in Table 1, one of which being 5% effective air void volume $V_{EAC}$, which I sought to achieve.

CONTROL OF VOIDAGE AT THE MIXING PLANT

The voidage of a blended mixture having a balance point proportion contains the specified amount of air.

To maintain continuity, I now explain how the voidage of the mixture can be accurately controlled by varying the quantity of asphalt cement or by varying the gradation over the No. 4 or similar size screen. As used in this specification and claims, "gradation", "gradation index", and "proportion" mean the percent of coarse aggregate retained on the No. 4 or similar size sieve and is expressed in relation to the total dry weight of all aggregates in the mixture.

FIG. 2 shows an expanded portion of FIG. 1 near the balance point and sets forth the 65% and 70% voids filled isograms and a series of asphalt cement isograms ranging from 4.4% to 5.6% by weight asphalt cement. Using this chart, percent voids filled or percent effect air voids can be controlled by varying proportion or quantity of asphalt cement to produce a uniform pavement. Conversely, to analyze any mixture of aggregates and asphalt cement, the percent voids filled and the percent effective air voids and be readily ascertained by measuring its proportion over the No. 4 sieve and locating the corresponding point on the chart of FIG. 2.

To illustrate a typical plant control use, assume that it is desired to alter an asphalt mixture of our exemplary aggregates from the balance point to a mixture having 70% voids filled at the specified five percent by weight asphalt cement. The gradation of the mix at the plant would then be increased to 53.4% (the intersection of the 5% asphalt cement isogram and the 70% voids filled isogram). At the gradation of 53.4%, air void volume is readily ascertained as approximately 4.6%. If a 65% void fill value is desired, the gradation would be decreased to 48.8% and the air void volume changes to 5.6%. With the use of the asphalt cement isograms, the air void volume and the percentage of voids filled can be systematically and accurately controlled without the need to perform extended laboratory tests and analytical procedures now required in the paving industry.

To illustrate another use of the chart of FIG. 2, the percentage air voids also can be altered at a fixed gradation by varying the quantity of asphalt cement. For example, suppose that it is desired to maintain a gradation of 50%. It is readily seen that the mixture will contain 5.5% air voids at five percent by weight asphalt cement. By increasing the quantity of asphalt cement to 5.4% by weight, the air voids will decrease to approximately 4.4%. Any quantity of air voids can be obtained merely by interpolation between the asphalt cement isograms depicted in FIG. 2. Thus it now is apparent that a paving contractor can now alter his mix within the predesignated job specifications to achieve uniformity in the pavement. Likewise, the contracting authority can now accurately specify the optimum job specifications merely by examining the fine aggregates to be used in the job and with specific gravity value and absorption value of aggregates. Similarly, the paving engineer can design the mix within given job specification to produce a pavement having predesignated physical parameters with the same knowledge about the aggregate qualities.

Figure 3:
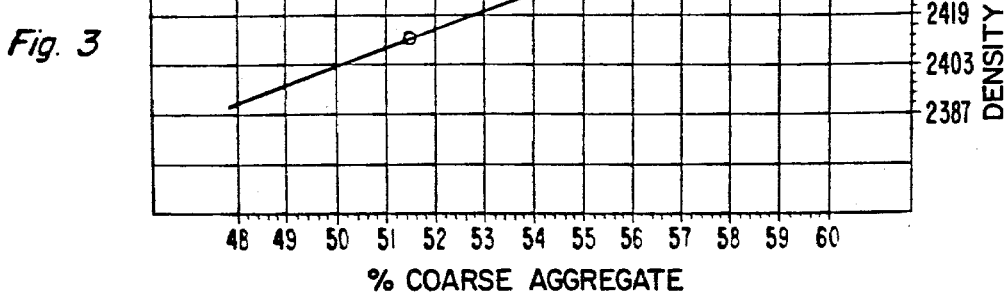
FIG. 3 depicts the density of aggregates of FIG. 2 as a function of gradation.

FIG. 3 depicts density of the aggregate mixture as a function of gradation. Simply by using density of the compacted mixture at the laydown site as a job control parameter, the voidage parameters of the mixture can readily be ascertained upon correlation with the graph of FIG. 3. Of course, any parameter of the mixture that varies as function of gradation or effective asphalt cement can be selected as a job control parameter. The best job control parameters are those of the Riguez specimen as produced from the fine aggregate samples withdrawn from the mixing plant. The job control engineer may use voidage as determined by conventional testing methods as a job control parameter, but then the advantage of prompt results as provided by the Riguez specimen or other measurements for plant control purposes is sacrificed.

As previously indicated, aggregates which are supplied to the paving plant can simply be controlled over a single screen size, such as the No. 4 screen, for controlling mix proportions the mixture. Instead of using the chart of FIG. 2, other graphical parametric representations and comparisons of the mixture against the Riguez specimen can be used. It would be impractical however to present all such representations for mix design, mix analysis, or job control methods so the illustrations presented herein should be construed as illustrative, rather than as a limitation.

FLEXIBILITY AND STABILITY MIX DESIGN PROCEDURES

The degree of flexibility and stability of a compacted mixture can be designed by determining their respective values as a function of the ratio of crushed fine aggregate to blend sand in the mixture. The optimum proportion for voidage control of the blended mixture of fine aggregate and coarse aggregate can be determined by use of the Riguez Index method described method. The blending ratio of crushed fines to blend said determines stability and flexibility. Once designing the proper blend of fines, plant control also can be effected by the method set forth above. Accordingly, my uniform pavement also can be produced to be uniform both in flexibility and stability. Furthermore, once the flexibility and stability functions are determined, any mixture of aggregates deviating from the specific ratio of crushed fines to blend sand can be adjusted in accordance with predetermined relationships.

Now, in designing a mixture having the desired flexibility and stability properties, I noted that with the use of the aggregates on hand, stability is increased as the percentage of crushed aggregate is increased and that flexibility (of flow) is increased as the percentage of asphalt cement is increased. These are two very important observations because now, a mix design engineer may proceed directly to the appropriate combination of crushed fines and blend sand to achieve the desired flexibility and stability. The procedure accordingly removes all guess work and trial-and-error which previously exists in mix design practice. Flow and stability are inversely proportional, however, both values may be achieved by increasing the extent of crushing of the crushed fine to produce greater stability for a given flexibility. I suggest crushed limestone to provide increased stability.

Figure 6:
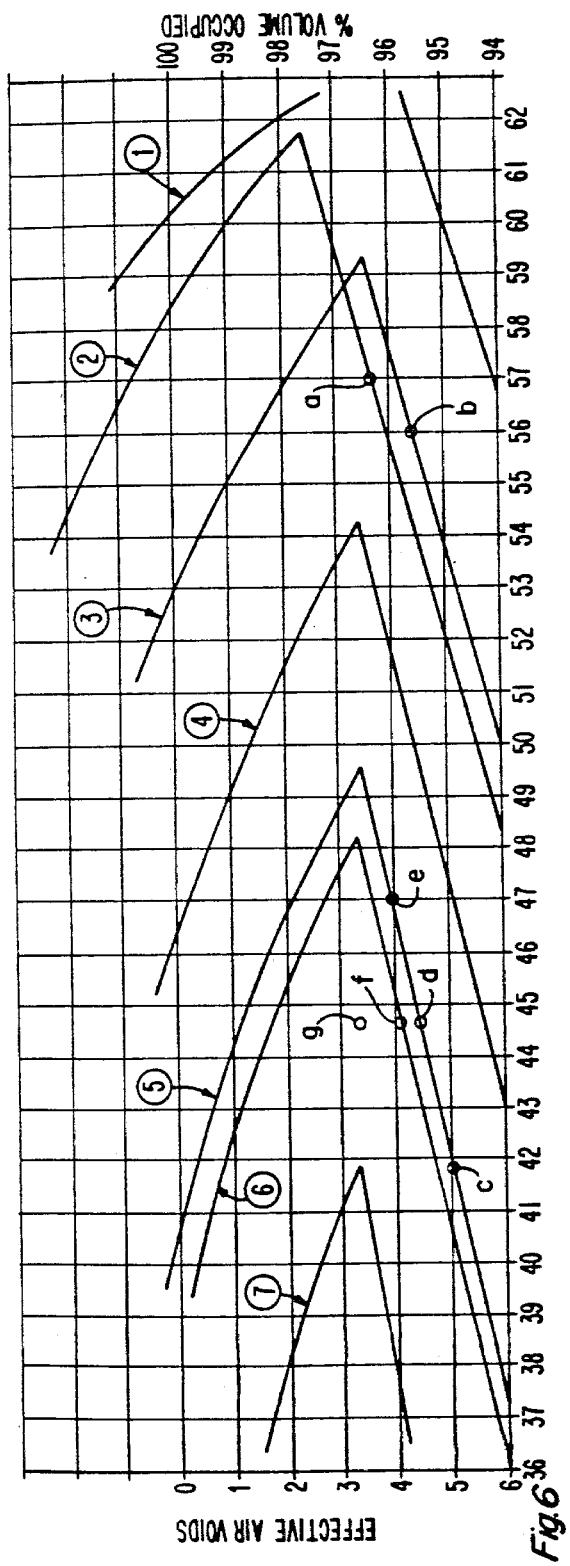
FIGS. 6 and 7 depict charts useful for designing flexibility and stability properties by varying the ratio of blend sand and crushed fine aggregates in the mix.
Figure 7:
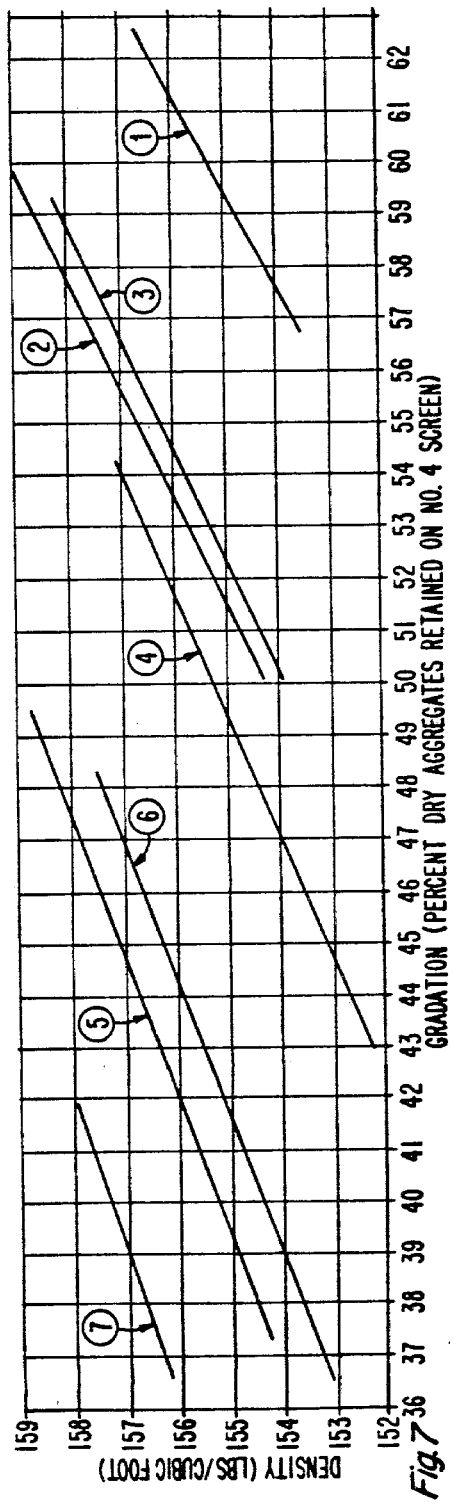

I have prepared in FIG. 6 a Riguez Value function for each of the seven different blends of crushed fines and blend sand (river sand). Curves 2 and 3 are examined at a gradation of 57.0% (Point a) and 55.4% (Point b), respectively. Both mixes have 5% asphalt cement, but the mix of Point (a) has 48.10% crushed fines and the mix of Point (b) has 57.45% crushed fines. Actual mixes at the selected gradation points were prepared. The mix of curve 2 had a stability of 3200 and flexibility of 5, while the mix of curve 3 had a stability of 2400 and flexibility of 10. Thus, it is seen that flexibility can be increased by adding more crushed fines in the blend of fine aggregate without changing the quantity of asphalt cement.

In examination of actual mixtures prepared at fine aggregate blends of curves 5 and 6 of FIG. 6, I note that at Point (d) and Point (f), stabilities of the samples were 3116 and 2590, respectively, and flexibilities were 9 and 9.5, respectively. Thus, flexibility can be increased by increasing the amount of asphalt cement. It also is interesting to note that for a higher percentage of crushed aggregate with the quantity of asphalt cement held constant the stability increased to 3150 and flow decreased to 8.5 (Point e); and that at a lower percentage of crushed aggregate with the quantity of asphalt cement held constant the stability decreased to 2243 and flow increased to 13 (Point c). This observation can be used generally to ascertain the appropriate combination blend sand, crushed fine aggregate and asphalt cement to design a mix having any degree of flexibility, stability, air voidage or other desired property.

Further, I have been able to achieve mixes having a stability exceeding 3000 under the Marshall standards with flexibility values between 8 and 16. Present methods permit at best may achieve flexibility of 5 to 8 for stabilities over 2000 psi under Marshall standards. Controlled stability and flexibility of my illustrated magnitudes have never been attainable by prior art methods.

Figures 4, 5:
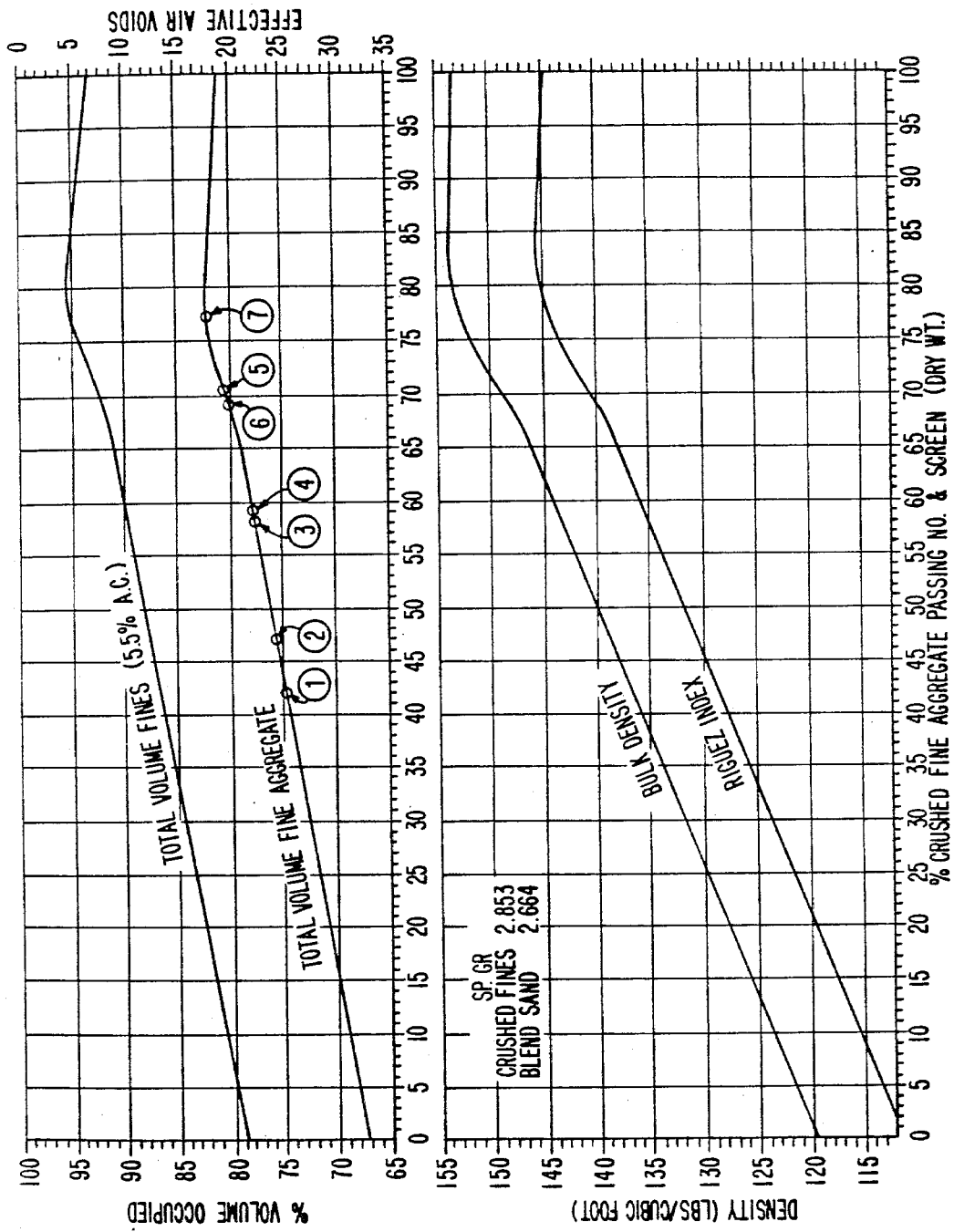
FIGS. 4 and 5 depict charts useful for mix design to determine structural strength of a mix.

FIGS. 4 and 5 show how the Riguez Index and total volume of the mixture varies according the ratio of blend sand to crushed fines. The specific ratios are indicated in the corresponding examples set forth below. It is seen, from FIG. 5 that the Riguez Index increases as the amount of crushed fines in the total mix increases. Thus a more dense mix with increase structural strength having a greater stability is attained with increased crushed fines.

For seven different combinations of crushed fines and blend sand, I show how the Riguez Index changes in FIG. 5. In FIG. 6, I show the volumetic comparisons as a function of gradation for each of the different combinations. I have produced several samples of mixtures within the constraints indicated on the curves for illustrating the variation of physical properties of the mix and thereby provide the means to guide the design engineer directly to the desire mixture for achieving predesignated physical properties without any guess work or trial-and-error process whatsoever. Several gradation points of some of the curves were selected to have mix parameters within a predesignated job specification (such as percent asphalt cement—5%, 5.5% percentage air voids 4%–5%, voids in mineral aggregate 15%–16%) and a mixture of the indicated blends were physically prepared. The physical parameters of some of the mixtures are tabulated below.

| Curve 1 | | |
|---|---|---|
| Total Mix | | |
| Coarse Rock | 60% | |
| Crushed Fines | 15% | |
| Blend Sand | 25% | |
| % Crushed Fines | 39.76 | |
| Bulk density of Fines | 135.58 | lbs/cubic foot |
| Riguez Index | 129.20 | |
| Sp. Gravity Fines (SSD) | 2.7763 | |
| Bulk Density Total Mix | 154.50 | |
| % Retained no. 4 screen | 58.50 | |
| % Asphalt Cement | 5.0 | |
| Volume of Rock | 47.12% | |
| Volume of Fines | 36.40% | |
| V.M.A. | 16.48% | |
| Effective Air Voids | 5.12% | |
| Voidless Mix | 162.84 | |
| Riguez Value | 101.6 | |
| Curve 2 | | |
| Total Mix | | |
| Coarse Rock | 59% | |
| Crushed Fines | 19% | |
| Blend Sand | 22% | |
| % Crushed Fines | 48.10 | |
| Bulk density of Fines | 137.32 | lbs/cubic foot |
| Riguez Index | 130.87 | |
| Sp. Gravity Fines (SSD) | 2.7793 | |
| Bulk Density Total Mix | 157.70 | |
| % Retained no. 4 screen | 57.00 | |
| % Asphalt Cement | 5.0 | |
| Volume of Rock | 48.01% | |
| Volume of Fines | 36.82% | |
| V.M.A. | 15.17% | |
| Effective Air Voids | 3.54% | |
| Voidless Mix | 163.49 | |
| Riguez Value | 101.0 | |
| Curve 3 | | |
| Total Mix | | |
| Coarse Rock | 45% | |
| Crushed Fines | 36% | |
| Blend Sand | 19% | |
| % Crushed Fines | 57.45 | |
| Bulk density of Fines | 141.89 | lbs/cubic foot |
| Riguez Index | 135.27 | |
| Sp. Gravity Fines (SSD) | 2.7989 | |
| Bulk Density Total Mix | 156.40 | |
| % Retained no. 4 screen | 55.40 | |
| % Asphalt Cement | 5.0 | |
| Volume of Rock | 46.23% | |
| Volume of Fines | 37.68% | |
| V.M.A. | 16.09% | |
| Effective Air Voids | 4.45% | |
| Voidless Mix | 163.68 | |
| Riguez Value | 98.85 | |
| Curve 4 | | |
| Total Mix | | |
| Coarse Rock | 37% | |
| Crushed Fines | 42% | |
| Blend Sand | 21% | |
| % Crushed Fines | 58.33 | |
| Bulk density of Fines | 143.13 | lbs/cubic foot |
| Riguez Index | 135.90 | |
| Sp. Gravity Fines (SSD) | 2.8003 | |
| Bulk Density Total Mix | 155.20 | |
| % Retained no. 4 screen | 49.60 | |
| % Asphalt Cement | 5.5 | |
| Volume of Rock | 40.86% | |
| Volume of Fines | 42.11 | |
| V.M.A. | 17.03% | |
| Effective Air Voids | 4.35% | |
| Voidless Mix | 162.26 | |
| Riguez Value | 98.82 | |
| Curve 5 | | |
| Total Mix | | |
| Coarse Rock | 40% | |
| Crushed Fines | 44% | |
| Blend Sand | 16% | |
| % Crushed Fines | 71.16 | |
| Bulk density of Fines | 149.49 | lbs/cubic foot |
| Riguez Index | 142.97 | |
| Sp. Gravity Fines (SSD) | 2.8253 | |
| Bulk Density Total Mix | 156.90 | |
| % Retained no. 4 screen | 44.50 | |
| % Asphalt Cement | 5.0 | |
| Volume of Rock | 37.20% | |
| Volume of Fines | 46.78% | |
| V.M.A. | 16.02% | |
| Effective Air Voids | 4.41% | |
| Voidless Mix | 164.14 | |
| Riguez Value | 98.90 | |
| Curve 6 | | |
| Total Mix | | |

-continued

| | | |
|---|---|---|
| Coarse Rock | 41% | |
| Crushed Fines | 42% | |
| Blend Sand | 17% | |
| % Crushed Fines | 69.30 | |
| Bulk density of Fines | 148.15 | lbs/cubic foot |
| Riguez Index | 140.52 | |
| Sp. Gravity Fines (SSD) | 2.8242 | |
| Bulk Density Total Mix | 156.12 | |
| % Retained no. 4 screen | 44.60 | |
| % Asphalt Cement | 5.5 | |
| Volume of Rock | 36.96% | |
| Volume of Fines | 46.21% | |
| V.M.A. | 16.83% | |
| Effective Air Voids | 4.02% | |
| Voidless Mix | 162.66 | |
| Riguez Value | 98.20 | |

Curve 7

| | | |
|---|---|---|
| Total Mix | | |
| Coarse Rock | 23% | |
| Crushed Fines | 62% | |
| Blend Sand | 15% | |
| % Crushed Fines | 75.92 | |
| Bulk density of Fines | 152.37 | lbs/cubic foot |
| Riguez Index | 144.54 | |
| Sp. Gravity Fines (SSD) | 2.8369 | |
| Bulk Density Total Mix | 156.50 | |
| % Retained no. 4 screen | 37.70 | |
| % Asphalt Cement | 5.5 | |
| Volume of Rock | 31.32% | |
| Volume of Fines | 51.96% | |
| V.M.A. | 16.72% | |
| Effective Air Voids | 3.90% | |
| Voidless Mix | 162.85 | |
| Riguez Value | 98.24 | |

FRICTION OVERLAYS USING RIGUEZ, STABILITY, & FLEXIBILITY DESIGN PROCEDURES

A friction course for covering existing asphalt or portland cement concrete surfaces also can be produced using the teachings of this invention. As previously indicated, prior art friction courses comprises open graded mixtures which subjected the asphalt cement to water stripping and aeration. A friction surface is established by the corners and edges of the aggregated protruding upwardly of the riding surface. A low voidage dense graded friction course is preferred, but production of such mixes having high stability and flexibility have previously been impossible. Aggregate particles of prior art friction surface tend to reorientate or submerge into the underlying pavement, particularly when heated or subjected to impact forces, thereby losing their friction properties immediately after load applications. Friction courses of smaller particles are more susceptable to loss of friction quality because usual level of displacement and reorientation occuring with the permissable wide mix tolerances generally given to paving contractors. Using the above teachings however, a uniform low voidage high strength and highly flexible dense graded friction course can now be produced using aggregates of any size because the stability, flexibility, and air voidage can be accurately designed in the laboratory and controlled at the mixing plant. Friction overlays using top size aggregates as small as one-fourth inch or one-half inch can now be produced. Such pavements have superior life and frictional qualities and can be revitalized decades after initial laying by typical emulsions or reclamite without stripping the asphalt cement from the aggregates.

Any overlay requires the overlay thickness to be at least twice the diameter of the largest particle. Since I now may use smaller particles for my friction overlay, I can produce a thin overlay, such as one-half to one inch thick thus resulting in substantial cost saving in production and consumption of asphalt cement.

To establish mix design for friction overlays, it only is necessary to select the top screen aggregate size which renders the desired friction. Of course, larger crushed particles provide greater frictional qualities than smaller crushed particles. I provide a top size screen for crushed particles of three-fourth inch, one-half inch, three-eights inch, or the No. 4 screen. For highway application, the one-half inch top size screen is recommended. Airport landing and runway pavements require anti-skid frictional qualities depending on the size, speed, and weight of landing aircraft operating from the airfield. For landing speeds exceeding 140 knots for heavy jet aircraft, high impact resistance, stability, and friction is desirable at the point of landing and throughout the entire length of the runway for skid control and breaking. Flexibility exceeding 12 or 14 and stability exceeding 2500 or 3000 under Marshall standards can be designed and produced, as indicated above. Separation of the pavment material must be minimized to prevent flying debris upon takeoff and landing.

In any friction course, the quantity of mineral filler passing the No. 200 screen should be limited to eight percent maximum. Five percent to six percent is ideal. The proportion of blend sand should be selected to give the desire flexibility and stability for the overlay friction surface. Air voids should be minimized to two percent to three percent to minimize aeration and water seepage and to protect the underlay surface, flexibility should be designed between 8 and 16, and stability should be between 2000 and 3000 psi under the Marshall standards. Accordingly, the designer of a friction overlay should first identify the top screen size to select level of friction desired, then perform the flexibility and stability design procedure set forth above to select the desired mix proportions (noting that increased crushed fines increases stability and increased asphalt cement increases flexibility), and then perform the volumetric analysis to achieve voidage generally between 2% and 3%.

This disclosure reveals the technical aspects of the Riguez Index method of design and stability and flexibility design. It is both a design method and control method and selects a particular gradation of aggregates or quantity of asphalt cement to render voidage values for producing uniform pavements. Thus substantial cost savings in construction are accorded. Further, the time required to perform the analysis and to ascertain corrective action at the mixing plant are much shorter so that results can be obtained in a few hours, instead of weeks. The principal design and control methods for selecting select proper combinations of aggregates are very easy to execute in the field and in the laboratory. The teachings of this invention will allow paving contractors to design their mixes, evaluate better sources of aggregates, give exact bids, and, more important, to have a very meaningful understanding of the proper design of their product by their own forces and control.

It will now be apparent to those skilled in the art from the above teachings that substantial uniform pavement areas can be produced by mix design, mix analysis, and job control methods other than those specifically indicated in my disclosure. My inventions includes the product and the processes disclosed as well as those products and processes that come within the scope of any modifications, adaptations, or extensions of the above teachings.

I claim:

1. An asphalt pavement structure of substantial area having substantially constant volume $V_{EA}$ of air voids under a standard compaction, said pavement comprising asphalt cement and a mixture of a coarse aggregate blending and a fine aggregate blending, the aggregates of said fine aggregate blending being variable in absorption, specific gravity, particle shape, size distribution, or consolidation under said standard compaction, and wherein the proportion of said coarse and fine aggregate blending is below the bulking point of the mixture, said proportion being periodically determined during the production of said pavement by the steps of:
   A. demarcating the aggregates to define coarse and fine aggregates,
   B. mixing a reference sample including said fine aggregate and a quantity of asphalt cement,
   C. compacting said reference sample under said standard compaction,
   D. determining an Index quantity that represents the quantity of fine aggregate per unit volume of said reference sample compacted under said standard compaction, and
   E. selecting a proportion of coarse and fine aggregates according to said volumetric relationship:

$$V_{CA} + V_{FA} + V_{EA} + V_{EAC} = 1 \text{ unit volume}$$

for differing proportions of coarse and fine aggregate, wherein the quantity of fine aggregates per unit of the combined volumes $V_{FA}$ and $V_{EAC}$ substantially equals said Index quantity, where $V_{EAC}$ is the volume effective asphalt cement, $V_{CA}$ is the volume of the coarse aggregate, and $V_{FA}$ is the solid voidless volume of the fine aggregate.

2. An asphalt pavement structure as recited in claim 1 wherein said constant volume of air voids is substantially constant constant between 2% and 5% by volume under said standard compaction.

3. An asphalt pavement structure as recited in claim 2 wherein said fine aggregate blending comprises 30% to 100% by weight of crushed fine mineral aggregate, and 0% to 70% by weight of mineral aggregate from a natural fine mineral aggregate source.

4. An asphalt pavement structure as recited in claim 3 wherein the crushed fine aggregate comprises crushed limestone and the natural fine aggregate comprises sand.

5. An asphalt pavement structure as recited in claim 3 wherein 100% by of the aggregates of said fine aggregate blending passes the No. 4 screen and 2% to 8% by weight of the dry aggregates pass the No. 200 screen.

6. An asphalt pavement structure as recited in claim 5 wherein the fine aggregate blending comprises the job mix formula:
   100% passes No. 4 screen
   70% to 85% passes No. 8 screen
   46% to 62% passes No. 16 screen
   25% to 40% passes No. 40 screen
   2% to 8% passes No. 200 screen 7. A highly stable dense graded asphalt friction overlay of substantial area for covering a pavement surface, said overlay containing less than 3.5% by volume of air voids $V_{EA}$ under a standard compaction and having a Marshall stability exceeding 1800 psi with a Marshall flexibility between 8 and 16, said friction overlay comprising asphalt cement and a mixture of a coarse aggregate blending and a fine aggregate blending, the aggregates of said fine aggregate blending being variable in absorption, specific gravity, particle shape, size distribution, or consolidation under a standard compaction, and wherein the proportion of said coarse and fine aggregate blending is below the bulking point of the mixture, said proportion being periodically determined during the production of said friction overlay by the steps of:
   A. demarcating the aggregates to define coarse and fine aggregates,
   B. mixing a reference sample including said fine aggregate and a quantity of asphalt cement,
   C. compacting said reference sample under said standard compaction,
   D. determining an Index quantity that represents the quantity of fine aggregate per unit volume of said reference sample compacted under said standard compaction, and
   E. selecting a proportion of coarse and fine aggregates according to said volumetric relationship:

$$V_{CA} + V_{FA} + V_{EA} + V_{EAC} = 1 \text{ unit volume}$$

for differing proportions of coarse and fine aggregate, wherein the quantity of fine aggregate per unit of the combined volumes $V_{FA}$ and $V_{EAC}$ substantially equals said Index quantity, where $V_{EAC}$ is the volume effective asphalt cement, $V_{CA}$ is the volume of the coarse aggregate, and $V_{FA}$ is the volume of the fine aggregate.

8. A friction overlay as recited in claim 7 wherein said standard compaction is a compactive effort as defined by the Marshall method.

9. A friction overlay as recited in claim 7 wherein at least 50% of the fine aggregates comprise crushed mineral aggregate.

10. A friction overlay as recited in claim 7 wherein the top size of the coarse aggregates is less than one inch mean diameter and greater than the No. 4 sieve.

11. A friction overlay as recited in claim 7 having uniform body wherein the size of substantially all of the coarse aggregates therein are closely graded, the median size of said closely graded coarse aggregate being within the range of one inch mean diameter and the No. 4 sieve.

12. A friction overlay as recited in claim 7 having an air void volume tolerance within ½% within said range of less than 3.5%.

13. An asphalt pavement as recited in claim 3 having an air void volume tolerance within ½% within said range of 2% to 5%.

14. An asphalt pavement as recited in claim 3 wherein said standard compaction is a compactive effort as defined by the Marshall Method.

15. A compacted asphalt paving composition containing a predetermined air void volume $V_{EA}$ under a standard compaction; said composition comprising a mixture of coarse aggregate, fine aggregate, and asphalt cement; the respective proportions of coare aggregate, fine aggregate, and asphalt cement being determined by the steps of:
   A. demarcating the aggregates to define coarse and fine aggregates,
   B. mixing a reference sample including said fine aggregate and a quantity of asphalt cement,
   C. compacting said reference sample under said standard compaction, D. determining an Index quantity that represents the quantity of fine aggregate per unit volume of said reference sample compacted under said standard compaction, and E. selecting a proportion of coarse and fine aggregates according to said volumetric relationship:

$$V_{CA} + V_{FA} + V_{EA} + V_{EAC} = 1 \text{ unit volume}$$

for differing proportions of coarse and fine aggregates, wherein the quantity of fine aggregates per unit of the combined volumes $V_{FA}$ and $V_{EAC}$ substantially equals said Index quantity, where $V_{EAC}$ is the volume effective asphalt cement, $V_{CA}$ is the volume of the coarse aggregate, and $V_{FA}$ is the volume of the fine aggregate.

16. A composition as recited in claim 15 wherein said coarse aggregate and fine aggregate are demarcated by the No. 4 aggregate sieve.

17. A composition as recited in claim 16 wherein said standard compaction is a compactive effort as defined by the Marshall method.

18. An asphalt surface of substantial area having a substantially constant volume $V_{EA}$ of air voids under a standard of compaction according to the Marshall method of compaction, said pavement comprising asphalt cement and a mixture of a coarse aggregate blending and a fine aggregate blending, the aggregates of said fine aggregate blending being variable in absorption, specific gravity, particle shape, size distribution, or consolidation, and wherein the proportion of coarse and fine aggregate blending is below the bulking point of the mixture, said proportion of coarse and fine aggregates being periodically determined during the production of said asphalt surface by the steps of:

A. demarcating the aggregates by a sieve size approximating the No. 4 sieve to define coarse and fine aggregates, B. mixing a reference sample including said fine aggregate and a quantity of asphalt cement, C. compacting said reference sample according to the Marshall method of compaction, D. determining an Index quantity that equals the weight of fine aggregate per unit volume of said reference sample compacted under the Marshall method of compaction, and E. selecting a proportion of coarse and fine aggregates according to said volumetric relationship:

$$V_{CA} + V_{FA} + V_{EA} + V_{EAC} = 1 \text{ unit volume}$$

for differing proportions of coarse and fine aggregate, wherein the weight of fine aggregates per unit of the combined volumes $V_{FA}$ and $V_{EAC}$ substantially equals said Index quantity, where $V_{EAC}$ is the volume effective asphalt cement, $V_{CA}$ is the volume of the coarse aggregate, and $V_{FA}$ is the volume of the fine aggregate.

* * * * *